United States Patent [19]

Zweigle

[11] 3,758,641

[45] Sept. 11, 1973

[54] ADHESION OF POLYMER GELS TO CELLULOSE

[75] Inventor: Maurice L. Zweigle, Midland, Mich.

[73] Assignee: The Dow Chemical Company, Midland, Mich.

[22] Filed: Jan. 21, 1971

[21] Appl. No.: 108,585

[52] U.S. Cl............... 260/874, 117/145, 117/148, 117/155 UA, 117/161 UZ, 252/2, 260/29.6 NR, 260/29.6 RW, 260/29.6 WB, 260/895
[51] Int. Cl..... C08f 33/08, C08f 41/12, C08f 35/06
[58] Field of Search ................ 260/874, 2 EN, 895; 252/2

[56] References Cited
UNITED STATES PATENTS

| | | | |
|---|---|---|---|
| 3,664,343 | 5/1972 | Assarsson | 260/2 EN |
| 3,247,171 | 4/1966 | Walker et al. | 260/80.3 |
| 2,698,793 | 1/1955 | Landes et al. | 260/2 EN |
| 3,313,736 | 4/1967 | Dickson et al. | 260/2 EN |
| 3,354,084 | 11/1967 | Katzer | 252/2 |
| 3,229,769 | 1/1966 | Bashaw et al. | 252/2 |

Primary Examiner—John C. Bleutge
Assistant Examiner—John Seibert
Attorney—Griswold & Burdick, D. H. Thurston and Richard W. Hummer

[57] ABSTRACT

Water-swellable crosslinked polymer gels show increased adhesion to wood and other cellulosic materials and also increased water-absorbing capacity when there is incorporated in the gel up to about an equal weight of a cationic polymer such as a polyalkylenepolyamine, a polyalkylenimine, or a cationic polyacrylamide. The increased adhesion of both dry and water-swollen gels makes the invention useful in fire fighting and in the preparation of water-absorbing laminates.

5 Claims, No Drawings

ADHESION OF POLYMER GELS TO CELLULOSE

BACKGROUND OF THE INVENTION

This invention relates to a process for sticking a water-swellable polymeric gel, either dry or in a water-swollen state, to wood or other cellulosic material. It also relates to the polymeric gel composition which exhibits increased adherence.

Water-swollen gels such as lightly crosslinked polyacrylamide have been used in fire fighting where the gelatinous material provides a means of applying and holding in place after application a substantial volume of water which would otherwise drain off rapidly and soon be lost. This material is useful in any kind of wood fire particularly, whether it is a burning house, a forest fire, or a brush or grass fire, where the fire is not only extinguished, but the water so applied remains present and effective over an appreciable length of time to prevent reignition or further combustion.

Dry water-swellable gels of the same type are useful in adding substantial water-absorbing capacity to paper or cotton laminates such as bandages, disposable diapers, or hospital bed pads where it is desirable to have a pad capable of absorbing considerable water or other aqueous fluid and yet exhibiting a relatively dry feel in its wet state.

In both of the above kinds of applications, adherence of the polymer gel, whether swollen with water or in the form of a dry powder or fine granules, to a cellulosic substrate is normally undesirably poor. Thus, water-swollen gel sprayed on trees, brush, or a house is likely to slide off and fall to the ground where it has little effect on a fire burning above it. A granulated or powdered gel interspersed between layers of absorbent tissue in a bandage pad or diaper tends to shift about and become unevenly dispersed or even lost during shipping or other normal handling. In either case, any significant increase in adhesion of gel to substrate would be of considerable advantage. It is known that increased adhesion of dry polymer gel to a cellulosic substrate is obtained when the substrate is first treated with a cationic polymer, the water-swollen gel is applied and then dried in place. This process is the subject of copending application Ser. No. 13,835 filed Feb. 24, 1970, assigned to a common assignee. However, for some reason gel so applied loses a significant part of its water absorbing capacity. Furthermore, it is evident that such a method would be of practical use only in particular applications.

SUMMARY OF THE INVENTION

It has now been found that water-swellable but substantially water-insoluble polymer gels, whether dry or swollen with water, exhibit significantly increased adhesion to wood, paper, cotton, or other cellulosic surface when the gel contains about 1-100, preferably 1-10 per cent by weight based on the dry gel of a water-soluble cationic polymer such as a polyalkylenepolyamine, a polyalkylenimine, or a cationic modified polyacrylamide. surprisingly, in view of prior knowledge, such a gel composition has a substantially higher capacity for absorbing water or other aqueous fluid than the corresponding untreated gel.

DETAILED DESCRIPTION

The cationic polymer is preferably mixed with the crosslinked polymer gel by adding the polymer in liquid form, usually as an aqueous solution, to the dry or partially water-swollen gel and mixing mechanically so as to obtain an intimate, essentially uniform mixture. For most purposes, the treated gel is then dried to obtain the mixture as fine granules or dry powder.

Polymers useful in the invention include cross-linked polymers and copolymers of acrylamide, polyacrylate salts, and polymers and copolymers of vinyloxazolidinone, vinylpyrrolidinone, methacrylate salts, and salts of styrene sulfonates such as sodium polystyrenesulfonate and sodium polyvinyltoluenesulfonate, also styrene-maleic anhydride copolymers which have been cross-linked by reaction with a glycol, such polymers having the properties of being water-swellable but substantially insoluble in water. Particularly valuable in the present invention are crosslinked polymers of acrylamide made by a process such as that described by Walker et al., U.S. Pat. No. 3,247,171. For example, a solution of 2–20 per cent acrylamide in water is polymerized in the absence of oxygen in the presence of 0.002–0.5 weight per cent of a diene crosslinking monomer such as methylenebisacrylamide at 25°–90°C and with a water-dispersible free radical-initiating catalyst for causing ethylenic polymerization. The resulting polymer is then preferably hydrolyzed by treatment with sufficient alkali metal hydroxide to convert up to about 50 per cent, preferably 10–40 per cent, of the carboxamide groups to alkali carboxylate. The hydrolyzed polymer is essentially composed of units having the formula

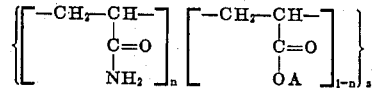

wherein A is an alkali metal ion such as Na or K, $n$ is 0.5 to about 0.9, $1-n$ defines the extent of hydrolysis, and $z$ is the number of mer units between crosslinks.

A polymer of similar molecular structure is made by copolymerizing acrylamide and acrylic acid or its alkali metal salt in the presence of a crosslinking mono-mer such as methylenebisacrylamide in the manner described. Such a polymer may have a somewhat higher proportion of carboxylate groups than shown by the above formula, for example, where $n = 0.2-0.9$.

The water-soluble cationic polymer additive is preferably a polyalkylenepolyamine, a polyalkylenimine, or a cationic derivative of polyacrylamide such as that obtained by reacting a partially hydrolyzed polyacrylamide with formaldehyde and dimethylamine to produce a Mannich base wherein a substantial portion of the carboxamide groups have dimethylaminomethyl substituents. The terms polyalkylenimine and polyalkylenepolyamine are used to define the lower alkylene materials such as polyethylenimine, polypropylenimine, and polybutylenepolyamine. Polyethylenimine and polyethylenepolyamine are preferred.

Of particular value for promoting gel adhesion are water-soluble, essentially linear polymers of acrylamide in which at least ten mole per cent of the combined monomer units are N-dimethylaminomethylacrylamide moieties and the remaining units correspond to monoethylenically unsaturated monomers copolymerizable therewith, at least about half of the monomers being hydrophilic to insure water solubility of the finished copolymer. Such polymers are conveniently prepared by reacting polyacrylamide with sufficient formaldehyde and dimethylamine to convert about 10–60 per cent of the carboxamide groups to N-(dimethylaminomethyl)-carboxamide group. Ordinarily, a small proportion of carboxylate groups is also present in the polymer structure. The aminomethylation of polymeric amides is described in detail by Suen et al., Ind. Eng. Chem. 49, 2132 (1956) and by Grimm et al., U.S. Pat. No. 2,328,901. Other such cationic polymeric substances such as polyaminoalkyl acrylates and cationic starches obtained by reacting amines with modified starches can also be used in the same way.

As defined above, the concentration of cationic polymer additive can be any amount from about one per cent based on the weight of dry gel up to about an equal weight which is a practical limit. Preferably the concentration is about 1–10 per cent. Concentrations above 10 per cent afford some additional effectiveness but are usually not economically practical.

For use in fire fighting, the soft water-swollen gel containing about the maximum absorbable water is usually best. The soft gel can be sprayed on the fire or around the perimeter of the fire to control its spread using pumps and spray nozzles adapted for handling such materials. It is often convenient to carry the dry powdered gel composition in separate containers and prepare the swollen gel by mixing it with water at the scene.

Application of the water-swollen gel to a fibrous cellulosic support to form a water-absorbent laminate may be done by any conventional means. A convenient and effective method for making a uniform laminate sheet comprises running the gel and the supporting fabric together between heated rolls whereby the gel is uniformly spread and pressed into intimate contact with the fabric and, at the same time, dried to produce the finished article. The quantity of gel applied is easily controlled by varying the nip or space between the rolls. While any temperature in the range of 100°–200°C is operable, it is generally preferred to dry the laminated gel at about 150°–180°C.

Another way of forming laminates comprises the mechanical mixing of the treated gel with a fibrous base, for example, in a paper pulp slurry to produce a composite of water-swollen gel containing dispersed fibers. Such a composite can be used advantageously as the gel layer bonded to a sheet of paper or cloth by the method previously described.

The invention has other modes of operation and use. A partially hydrolyzed, lightly crosslinked polyacrylamide gel can be made by carrying out the polymerization of acrylamide in the presence of aqueous sodium carbonate as described by Proffitt, U.S. Pat. No. 3,022,279. The water-swellable gel can be produced in bead form by the inverse suspension polymerization of water-soluble monomer as described by Friedrich et al., U.S. Pat No. 2,982,749 and the water-swollen beads then applied to a fabric backing. A combination of these or other known procedures as described above can be employed in the practice of the present invention for various applications.

To prepare a water-absorbing laminate, a polymer composition as described above is applied to the fibrous cellulosic base as a water-swollen gel containing about 5–50% by weight of polymer, preferably about 8–15%, in a quantity representing about 0.005–200 parts of polymer per part by weight of base. Preferably, about 0.2–5 parts by weight of polymer is applied to the fibrous support as the water-swollen gel.

Many uses are apparent for such laminates. For example, a laminate with absorbent paper can be used as a facial tissue with enhanced capacity for absorbed moisture. The same laminate can be used as the absorbing part of a disposable diaper. For such use, the laminate is preferably shredded for faster absorption. A laminate on heavy backing such as canvas or burlap can be used as a portable base for an ice rink. In such an application, the laminate has a coating of gel heavy enough to permit wetting the surface with enough water to start a suitable base, allowing it to freeze, and continuing to build up a proper rink surface by repeating the process. At the end of the skating season, the rink can be allowed to thaw and dry and the dried laminate can then be rolled up for storage and reuse of disposal. A similar laminate can be used in hot weather as a roof covering to hold water for evaporative cooling of a house. The covering is easily removable in cooler weather. Other uses for a laminate of the present invention include super-absorbent bandages and dressings, an undersheet or pad in a sick-bed or baby bed, and a cover to retain moisture on a slope for skiing or sledding. Many other uses are easily apparent.

In a particular embodiment of the invention the laminates are employed as moisture barriers in porous soil. Thus, for example, in preparing irrigation ditches, sheets of the dry laminates are laid on the bottom and sides of the excavation and covered by backfilling with 4 to 12 inches of soil. Thereafter when percolating water reaches the polymer, the latter swells and plugs the interstices of the soil creating an effective moisture barrier.

EXAMPLES 1–3

Samples of granular polyacrylamide lightly crosslinked with 200 ppm of N,N'-methylenebisacrylamide and partially hydrolyzed to convert about 25 per cent of the amide groups in the polymer to carboxylate groups were soaked in aqueous solutions of cationic polymers so as to provide in each 5 per cent by weight cationic polymer based on dry polyacrylamide gel. The various impregnated gels were dried and the dry gels were checked for absorbing capacity by soaking in 0.27 molar sodium chloride solution for about 15 minutes and weighing after draining for about ten minutes. The absorbing capacities are listed in the following table along with the capacity of the untreated polymer gel for purpose of comparison.

| Example No. | Cationic Polymer | Capacity g. 0.27 M NaCl/g. gel |
|---|---|---|
| Blank | none | 97 |
| 1 | PEI[1] | 114 |
| 2 | CPA-1[2] | 105 |
| 3 | CPA-2[3] | 105 |

[1] polyethylenimine of about 60,000 average mol. wt.
[2] polyacrylamide of about 500,000 ave. mol. wt. reacted with dimethylamine and formaldehyde to substitute about 40% of the amide nitrogen atoms with dimethylaminomethyl groups.
[3] same as (2) but with polyacrylamide of about a million molecular weight and about half of the amide groups substituted.

When the above tests are repeated using pure water in place of the dilute salt solution, absorbing capacities several times those shown above are found, but in each case the capacities of the cationic polymertreated gels are substantially higher than the capacity of the untreated gel.

WOOD ADHESION TESTS

Samples of the untreated gel and the cationic treated gels of Examples 1–3 were soaked in water to the limit of their absorbing capacities. Adhesion of the swollen gels to wood was estimated qualitatively by inserting a dry wooden tongue depressor into the gel, withdrawing it to observe the quality of adhering gel on the depressor, and shaking the gel-coated stick to observe the relative adhesion of the water-swollen gel to the wood. In each case, more of the cationic-treated gel stuck to the wood, by a factor of two or three times the amount of untreated polymer gel, and the treated gel stuck tenaciously to the wood on shaking whereas the lesser amount of untreated gel was relatively easily shaken free from the wooden test pieces. Similar performance is observed when the cationic additive is increased to 100% by weight based on untreated gel.

Similar results are obtained in the absorbing capacity and wood adhesion tests described above when the cationic polymer additive is a polyalkylenepolyamine such as a polyethylenepolyamine or a polybutylenepolyamine, or another polyalkylenimine such as polypropylenimine as previously described.

Also, analogous results are obtained with such cationic polymer additives when the water-swellable gel is a crosslinked polyacrylate or other such polymer such as the crosslinked polymers and copolymers of vinyloxazolidinone, vinylpyrrolidinone, methacrylate salts, and salts of styrenesulfonates such as sodium polystyrenesulfonate, sodium polyvinyltoluenesulfonate, and cross-linked styrene-maleic anhydride copolymers.

I Claim:

1. A water-swellable, substantially water-insoluble polymer gel which is a crosslinked polymer or crosslinked copolymer of acrylamide, an acrylate salt, vinyloxazolidinone, vinylpyrrolidinone, a methacrylate salt, or a styrenesulfonate salt, or a copolmer of styrene and maleic acid which has been crosslinked by reaction with a glycol, said gel containing in intimate mixture therewith about 1–100 percent based on the weight of dry gel of a water-soluble cationic polymer, wherein said cationic polymer is at least one of a polyalkylenepolyamine, a polyalkylenimine, and a polyacrylamide wherein about 10–60 percent of the carboxamide groups have been converted to N-(dimethylaminomethyl)carboxamide groups.

2. The composition of claim 1 wherein the polymer gel is a crosslinked polyacrylamide prepared by aqueous ethylenic polymerization in the presence of 0.002–0.5 weight per cent of a diene crosslinking monomer and subsequently partially hydrolyzed with alkali metal hydroxide to convert 10–50 per cent of the carboxamide groups in the polyacrylamide to carboxylate groups.

3. The composition of claim 2 wherein the cationic polymer is present in a quantity of 1–10 per cent by weight based on the weight of dry gel.

4. The composition of claim 2 wherein the cationic polymer is polyethylenimine.

5. A process for improving the adhesion of a polymer gel to a cellulosic substrate which comprises applying the gel as a water-swollen mixture as defined in claim 1.

* * * * *